(12) United States Patent
Maiorano Quiroga et al.

(10) Patent No.: US 10,394,842 B1
(45) Date of Patent: Aug. 27, 2019

(54) BOUNDARY-BASED DATA CONVERSION

(71) Applicant: Workday, Inc., Pleasanton, CA (US)

(72) Inventors: Salvador Maiorano Quiroga, San Ramon, CA (US); Vishal Garg, San Ramon, CA (US); Zhenpeng Li, San Ramon, CA (US)

(73) Assignee: Workday, Inc., Pleasanton, CA (US)

( * ) Notice: Subject to any disclaimer, the term of this patent is extended or adjusted under 35 U.S.C. 154(b) by 290 days.

(21) Appl. No.: 15/085,892

(22) Filed: Mar. 30, 2016

(51) Int. Cl.
*G06F 17/30* (2006.01)
*G06F 16/25* (2019.01)
*G06F 16/23* (2019.01)

(52) U.S. Cl.
CPC ........ *G06F 16/258* (2019.01); *G06F 16/2365* (2019.01)

(58) Field of Classification Search
CPC ................................................ G06F 17/30005
See application file for complete search history.

(56) References Cited

U.S. PATENT DOCUMENTS

| | | | | |
|---|---|---|---|---|
| 6,356,901 B1* | 3/2002 | MacLeod | .......... | G06F 17/30563 |
| 6,564,219 B1* | 5/2003 | Lee | .................... | G06F 17/30557 |
| | | | | 707/769 |
| 2004/0015823 A1* | 1/2004 | Nolan | ....................... | G06F 8/20 |
| | | | | 717/104 |
| 2011/0179015 A1* | 7/2011 | Balebail | ............ | G06F 17/30418 |
| | | | | 707/720 |

* cited by examiner

*Primary Examiner* — Hung Q Pham
(74) *Attorney, Agent, or Firm* — Van Pelt. Yi & James LLP

(57) ABSTRACT

A system for data conversion includes an interface and a processor. The interface is to receive an indication to convert a set of data. The processor is to determine a subset of the set of data based at least in part on a boundary condition; convert the subset of data to a converted subset of data; and provide the converted subset of data.

18 Claims, 10 Drawing Sheets

300

Conversion Definition
- Activation Toggle
- Finalization Toggle
- Data Structure Change
- Verification Definition

Conversion Manager

352
Conversion Data Traverser

354
Verification Data Traverser

BOUNDARY-BASED DATA CONVERSION

BACKGROUND OF THE INVENTION

A database system stores data using a set of data structures. In enterprise database systems, each data structure may be stored a large number of times for a large company. For example, the employee data structure is stored many times (e.g., one employee data structure per employee), the payroll data structure is stored many times (e.g., one payroll result data structure per paycheck issued), etc. In the event a data structure needs to be modified, all stored instances of the data structure need to be modified. This can take a very long time for a large database, causing system down time. In some events, a conversion from a first data structure type to a second data structure type is executed incorrectly, resulting in errors.

BRIEF DESCRIPTION OF THE DRAWINGS

Various embodiments of the invention are disclosed in the following detailed description and the accompanying drawings.

FIG. 3A is a diagram illustrating an embodiment of a conversion definition.

FIG. 3B is a block diagram illustrating an embodiment of a conversion manager.

DETAILED DESCRIPTION

Figure 1:
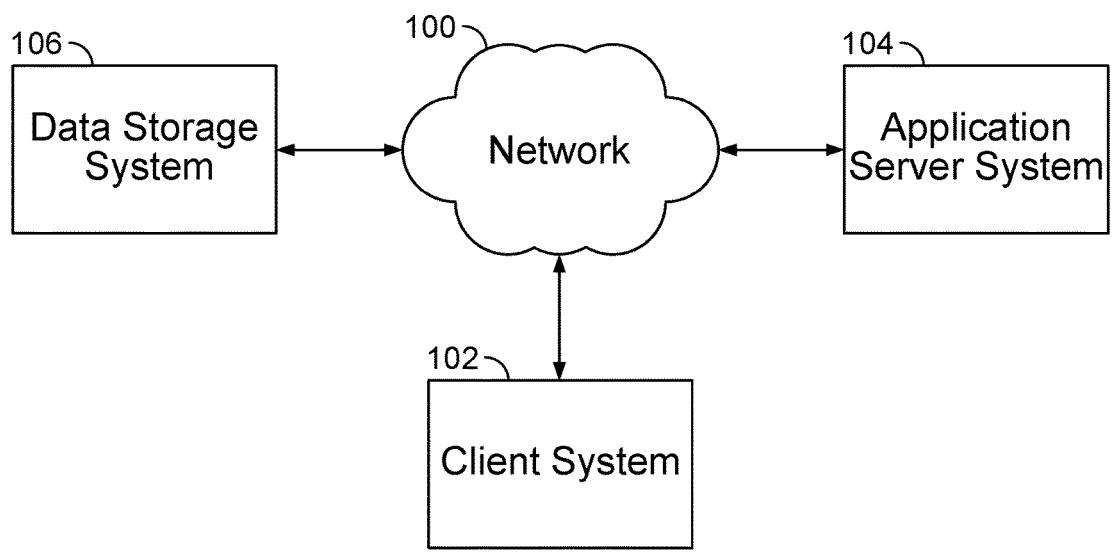
FIG. 1 is a block diagram illustrating an embodiment of a system for boundary-based data conversion.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for boundary-based data conversion is disclosed. The system comprises an interface to receive an indication to convert a set of data and a processor to determine a subset of the set of data based at least in part on a boundary condition, convert the subset of data to a converted subset of data, and provide the converted data. In some embodiments, the processor is further to convert a subsequent data subset of the set of data until all of the set of data is converted.

In some embodiments, a system for boundary-based data conversion is a robust system that can convert a data set while the data set is simultaneously being updated. In some embodiments, a system for boundary-based data conversion converts a data set one subset at a time, wherein subset divisions are determined by a boundary condition. In some embodiments, a system for boundary-based data conversion is further able to verify and fix faulty conversions and chain together multiple needed conversions or processes to be done on the data set.

In some embodiments, enterprise software systems for customers or tenants are constantly evolving. Evolutions may be due to new customer requirements or re-factoring to make software fixes for critical issues or just to make the software more efficient. Evolutions manifest themselves as updates, patches, bug fixes, newer releases of the software, etc. A new release of the software sometimes requires some structural changes as to how existing customer data is represented, requiring data from a previous release to be converted. Depending upon the size of the tenant, data volumes to be converted can be high. At some point, converting customer data can cause processing times to exceed what is reasonable for the software to be released to the customer. Most businesses are time-bound by real-world business situations (e.g., fiscal period end, pay period close, enrollment period end, etc.), so any downtime caused by a newer release of the software translates to operating cost.

In some embodiments, a common solution is to distribute and parallelize the data conversion work to reduce time. However, distributed computing and parallel computing is difficult for even the most senior programmers. Also, the distributed computing and parallel computing may introduce bugs that can be difficult to find and behavior that can be difficult to understand. Moreover, distributed computing and parallel computing only reduces down time—it does not eliminate the down time. Also, for service providers servicing multiple tenants where data conversion needs to run for each tenant, running distributed or parallel mode across all tenants would quickly become unmanageable.

In some embodiments, the down time is eliminated with an on-the-fly data conversion system, wherein a processor converts data in the background and converts a requested data object before responding to a user request in the case that the data object was not yet converted. While this eliminates need for down time, the original data structure is not preserved. In some embodiments, when the data being converted are critical, the data object in the original state is desired during and after the conversion. In some embodiments, immediate verification of the data conversion is desired. In some embodiments, multiple processes need to proceed sequentially before or after the conversion of each data structure, for example, conversion of related data structures.

In some embodiments, a boundary-based system for data conversion eliminates down time while leaving the original data unchanged by storing the converted data in a memory location different than the original data. The original data remains accessible throughout the entire time of conversion. In various embodiments, the system provides a conversion definition, boundary condition, conversion manager, or any other appropriate component. In some embodiments, the conversion manager comprises one or more data traversers which perform the data conversion.

In some embodiments, a data traverser performs a process on each data object in a subset one data object at a time; for example, a data traverser performs a conversion or verification. In some embodiments, a first data traverser and a second data traverser simultaneously process the same set of data. In some embodiments, multiple data traversers avoid simultaneously processing a specific data object of the set of data. In some embodiments, multiple data traversers share a boundary definition and a first data traverser reaching a boundary causes a second data traverser to begin processing the set of data. In some embodiments, processes are daisy chained such that multiple conversions or processes are occurring on the data set at once. The conversion manager provides a mechanism to traverse through the data, completing the conversion on one data subset before moving on to the next data subset. In some embodiments, servers servicing user requests continue to use the original data while the data conversion is happening. In some embodiments, upon the completion of the data conversion, the developer switches over to use the converted data. The original data is deleted or stored as desired. In some embodiments, the processor stores the converted subset of data in a memory location different than the original subset of data. In some embodiments, the converted data are stored in a different memory location so that any unexpected issues arising in the conversion will not cause down time, since the original data set is live and accessible at all times.

In some embodiments, a conversion definition allows an application developer to specify the data to be converted and the structural change. In some embodiments, a boundary condition allows the application developer to specify the subset of data that will be converted at a time.

In some embodiments, the data conversion definition comprises processes to be performed sequentially on the subset of data besides an initial structural change. In some embodiments, the process comprises a verification. For example, in some embodiments, the data conversion definition comprises a verification step occurring after a structural change step during which the structural change to the data is verified. In some embodiments, the data conversion definition comprises a process that triggers another process based on the result of the process. For example, a desired response to a failed verification result is defined by a developer, such as rerunning the structural change step on that subset of data or halting all data conversion. In some embodiments, the data conversion definition comprises multiple structural change and verification pairs. In some embodiments, the data conversion definition comprises processes that are based on the data but do not alter the data, such as a process that stores the number of times a certain value occurs in a step of the data conversion. In some embodiments, the data conversion definition comprises processes that are not based on the data, such as a process that stores the number of times the verification step failed. In some embodiments, the data conversion definition comprises a first conversion of a data object and a subsequent conversion of a related data object.

In some embodiments, the conversion system is applicable to diverse databases due to the boundary condition basis. The boundary condition is chosen by the developer based on the needs of the specific database and conversion case. This allows the system the flexibility to convert the data structure efficiently. In some embodiments, a user uses the boundary-based data conversion system to convert an array that contains information on an employee name, date, and number of dependents to a date-indexed structure containing the same information. A boundary condition of days prompts the data traverser to form subsets of all the data entered on the same day. In some embodiments, the conversion creates a key-value structure in which the date is the key and an array containing the employee name and address on that date is the value. In some embodiments, using the date as the boundary allows one full converted object to be stored to memory at a time. Without the boundary condition, typical data conversion would occur one array at a time. In some embodiments, traversing through the data set one array at a time would require many modifications of each converted object.

In some embodiments, a boundary-based system for data conversion converts data from a previous version of a data structure to a new version of a data structure. In some embodiments, a boundary-based system for data conversion is used by an application developer for updating a data structure that is already in use in a database system. In a large database system, traversing all data to convert old versions of the data structure can take a prohibitively long time (e.g., days). While the data traversal is taking place, the original versions of the data structure are live and unaltered by the data conversion. Down time is eliminated because a usable version of the data is persistently available to the user.

In some embodiments, the boundary-based conversion system is loaded during a software update process. In some embodiments, a separate set of processes is started for each separate client or tenant data (e.g., data isolated within a software as a service (SaaS) database). In some embodiments, more than one set of processes is started for each client, each associated with a different data conversion.

FIG. 1 is a block diagram illustrating an embodiment of a boundary-based system for data conversion. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client system 102, application server system 104, and data storage system 106, communicate via network 100. In some embodiments, client system 102 comprises a system for accessing application server system 104 or data storage system 106. In some embodiments, application server system 104 comprises a data conversion system for converting data from data storage system 104. In various embodiments, the network system comprises 1, 2, 5, 10, 22, 122, or any other appropriate number of client systems. Data storage system 106 comprises a database system for maintaining a database. In some embodiments, data storage system 106 comprises a human resources database system.

Figure 2:
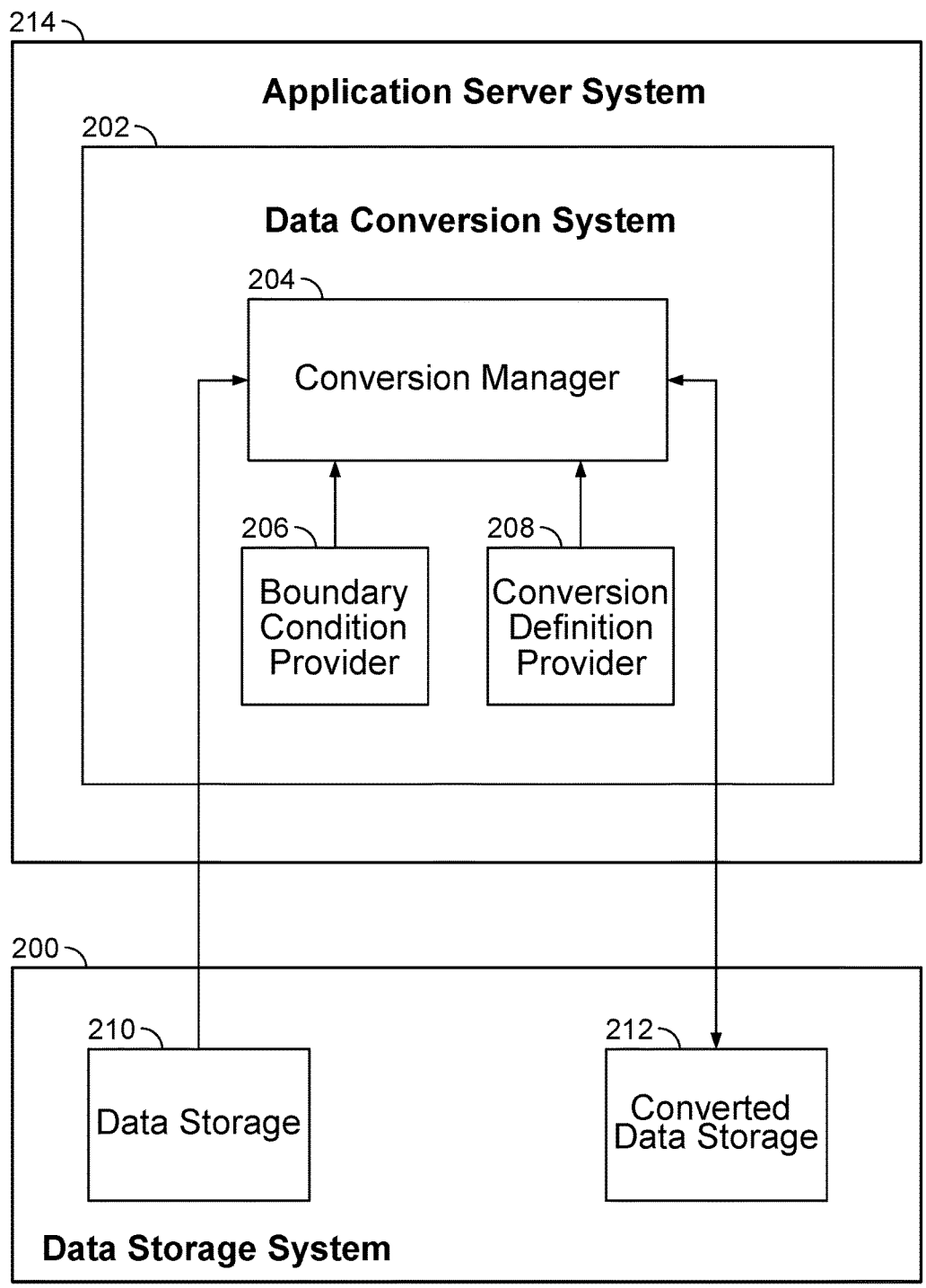
FIG. 2 is a block diagram illustrating an embodiment of a data conversion system and a data storage system.

FIG. 2 is a block diagram illustrating an embodiment of a boundary-based data conversion system. In some embodiments, application server system 214 is implemented by application server system 104 of FIG. 1. In some embodiments, data storage system 200 is implemented by data storage system 106 of FIG. 1. In some embodiments, application server system 214 comprises data conversion system 202 which converts data in data storage 210 and stores the converted data in converted data storage 212 in a different location in storage system 200. In the example shown, data conversion system 202 is in communication with data storage system 200. In some embodiments, data conversion system 202 comprises data conversion definition provider 208, boundary condition provider 206, and conversion manager 204. In some embodiments, a definition for converting data and a definition for a boundary condition are received by conversion manager 204 using an input interface. In some embodiments, data conversion definition provider 208 and boundary condition provider 206 are implemented using a processor. In some embodiments, data conversion definition provider 208 and boundary condition provider 206 are implemented not by the application server system but by the client system, and the definition and condition are provided over a network. In a system for boundary-based conversion, a subset of a data set to be converted is determined based at least in part on a boundary condition provided by boundary condition provider 206. In various embodiments, the elements of a data conversion system are implemented using separate processors, all using a single processor, or using multiple processors allocated in any other appropriate way. In some embodiments, the communication shown between blocks of the block diagram are in communication via network 100 of FIG. 1.

FIG. 3A is a diagram illustrating an embodiment of a conversion definition. In some embodiments, data conversion definition 300 is a data object comprising information needed to execute a data conversion. In the example shown, the conversion definition comprises four branches: an activation toggle, a finalization toggle, a data structure change definition, and a verification definition. In some embodiments, the indication to convert the set of data comprises an activation toggle. In some embodiments, the indication to convert the set of data comprises a finalization toggle. In various embodiments, data conversion definition 300 comprises a data structure change definition which describes the data structure change to occur in the conversion and comprises an input data structure, a format change, a relationship, multiple modifications, or any other appropriate data structure changes. In some embodiments, data conversion definition 300 comprises an input data structure (e.g., a data structure to be converted). In some embodiments, data conversion definition 300 comprises one or more data structure modifications. In some embodiments, data conversion definition 300 comprises a mapping (e.g., a conversion from an input data structure to an output data structure). In some embodiments, data conversion definition 300 comprises a relationship (e.g., a relationship between an input data structure and an output data structure).

In some embodiments, a conversion definition is for a specific type of structural change. A structural change can be, for example, of the following types:

Data Storage Format Change–A data storage conversion definition comprises a set of classes to be converted from one type of storage format or representation in memory to different type of storage format or representation in memory. In some embodiments, a data storage conversion definition also specifies an activation toggle, that activates the conversion when enabled. In some embodiments, a data storage conversion definition also specifies a finalization toggle that finalizes the conversion when enabled. In some embodiments, when the conversion is set as finalized, a new data storage is enabled for use and replaces an old data storage.

Relationship (1>2)—A relationship (1>2) conversion definition specifies a conversion from a uni-directional (1-way) relationship definition between two classes of data to a bi-directional (2-way) relationship definition between the two classes of data. In some embodiments, the original 1-way relationship comprises a first class of data comprising a reference to a second class of data, wherein the second class of data has no reference to the first class of data. In some embodiments, conversion to a bi-directional relationship necessitates the population of the relationship from the second class of data to the first class of data. For example, a payroll result class of a human resources system stores a reference to an employment class while the employment class does not store a reference to the payroll class. In some embodiments, the relationship (e.g. payroll result for employment) is desired to be changed from 1-way to 2-way, causing the creation of a new relationship from the employee class to the payroll result class. In some embodiments, the relationship conversion allows the system to query employment instances for payroll result information. In some embodiments, the bi-directional relationship allows the system to directly find payroll results based on employment information, rather than having to scan all the payroll results to check whether it belongs to a particular employment instance. In some embodiments, the conversion definition specifies an activation toggle, which activates the conversion when set as enabled. In some embodiments, the conversion definition specifies a finalization toggle, which when set as enabled signifies that all data is copied to the other side of the relationship and that the relationship from the first class to the second class is available for use as a bi-directional relationship.

In some embodiments, the conversion definition language guarantees that each conversion is correctly defined. For example, an application developer is displayed an error message in the event that a data storage change is invalid. An example of an invalid data storage change comprises an indication to change data to a specified data storage format when the data is already in that specified storage format. An example of an invalid relationship (1>2) change comprises an indication to convert a uni-directional relationship between two data classes to a bi-directional relationship in the case that a bi-directional relationship already exists. In some embodiments, the conversion definition language allows the system to avoid common run time application programming errors by catching invalid logic at design time.

In some embodiments, data conversion definition 300 comprises a verification definition to assess whether a data structure change was performed correctly. In some embodiments, conversion definition 300 comprises multiple processes performed sequentially on the set of data. In some embodiments, the conversion definition stipulates that a subset of data is converted and the conversion is verified before the subset of data undergoes a second conversion and verification. In some embodiments, the conversion definition comprises multiple data structure changes and verification definitions. In some embodiments, data conversion definition 300 comprises a process that triggers another process based on a result of the process. For example, failure of a verification as defined in a verification definition triggers the associated conversion to be performed again.

In some embodiments, a conversion definition comprises an activation toggle and finalization toggle. For example, an activation toggle and a finalization toggle comprise:

Activation—each conversion specifies a toggle on its definition. When applying a new patch release, conversion manager 204 of FIG. 2 evaluates the toggle for each conversion prior to loading a tenant. Unless the conversion is already marked as COMPLETE, the conversion is ACTIVATED in the event that the toggle is enabled. A patch release is generally applied weekly and in various embodiments, does or does not contain more conversion definitions.

Finalization—When all customer data for a given structure change conversion is persisted (e.g., a completion of all conversions indicated) and an end to conversion is indicated, the conversion is marked as COMPLETE. For conversion run time on the subsequent patch, post loading of the tenant the conversion is marked as FINALIZED. Conversion on subsequent releases is then marked SKIPPED from activating forever and is considered end-of-life'd (e.g., this process is marked as completed and terminated).

FIG. 3B is a block diagram illustrating an embodiment of a conversion manager. In some embodiments, conversion manager 350 of FIG. 3B comprises conversion manager 204 of FIG. 2. In the example shown, conversion manager 350 comprises conversion data traverser 352 which traverses each data object in a subset and converts it according to a data structure change. Conversion manager 350 comprises verification data traverser 354 which traverses each data object in a subset and verifies it according to verification definition. In some embodiments, both traversers simultaneously process the set of data. In some embodiments, both traversers share a boundary condition. In some embodiments, conversion data traverser 352 begins conversion of the data set as the only active data traverser. Upon conversion data traverser 352 reaching a boundary as set by boundary condition, second traverser 354 begins processing the subset of data that was converted. In some embodiments, the traversers continue conversion and verification of a subsequent data subset of the set of data until all of the set of data is converted and verified. In some embodiments, the verification traverser is always one subset of data behind the data conversion traverser in processing the data set. In some embodiments, a first data traverser and a second data traverser do not simultaneously process a specific data object of the set of data. In some embodiments, conversion manager 350 comprises a data traverser for each process defined in conversion definition 300 in order to speed up completion of the conversion.

Figure 4:
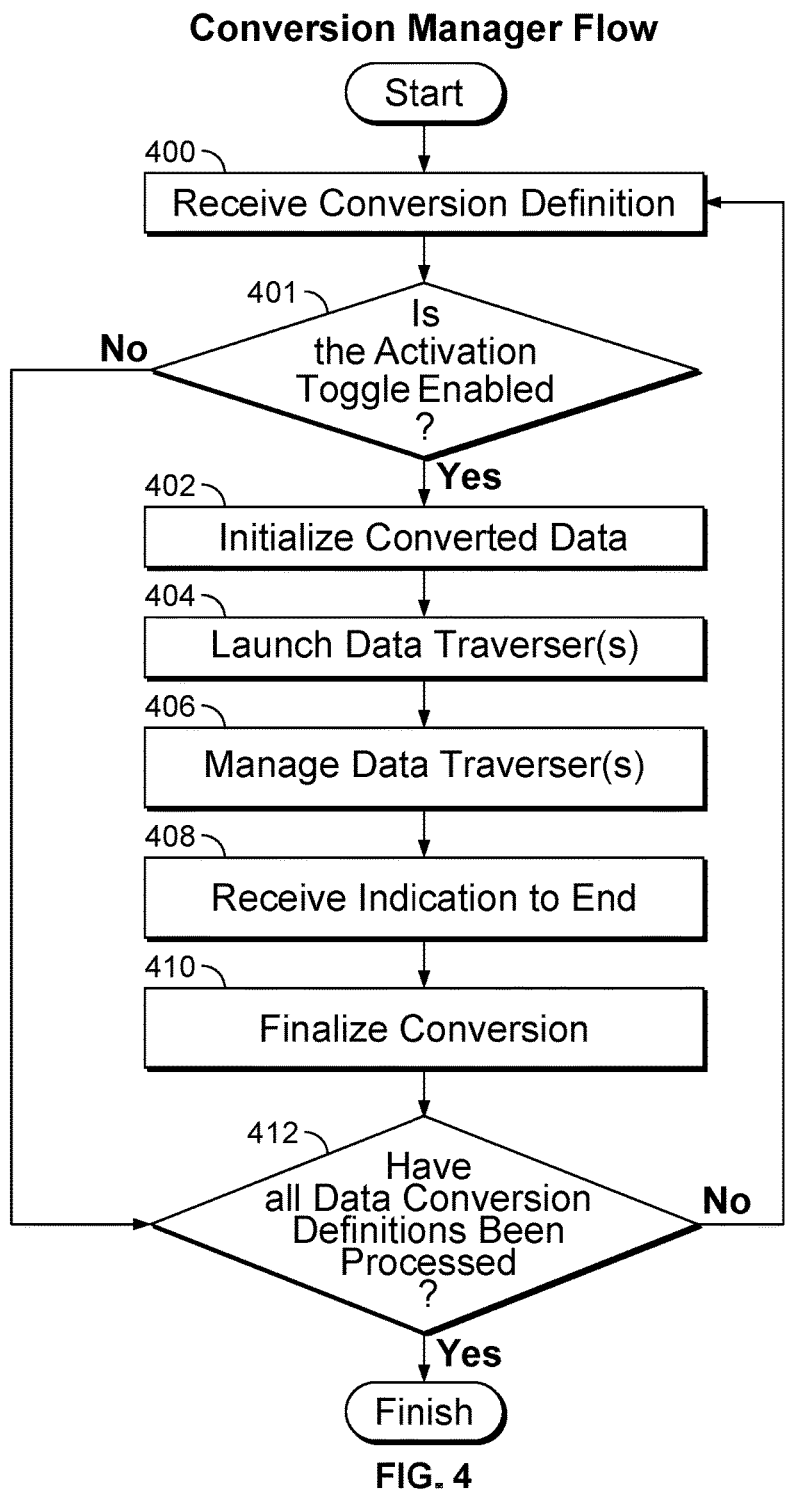
FIG. 4 is a flow diagram illustrating an embodiment of a conversion manager process for boundary-based data conversion.

FIG. 4 is a flow diagram illustrating an embodiment of a conversion manager process for boundary-based data conversion. In some embodiments, the indication to convert a set of data comprises a data conversion definition. In 400, a conversion definition is received. In 401, it is determined whether the activation toggle is enabled. For example, the conversion manager determines whether the activation toggle of the conversion definition triggered. In the event that the activation toggle is not enabled, control passes to 412. For example, if the activation toggle is not enabled, then the conversion manager does not begin the conversion described in that definition, instead, the conversion manager checks for data conversion definitions that have not yet been processed in 412. In some embodiments, the indication to start comprises an activation toggle that is enabled or a finalization toggle that is not enabled. In the event that the activation toggle is enabled, control passes to 402. In 402, converted data is initialized. In some embodiments, the converted data is initialized in a memory location different than the original data. In 404, data traverser(s) is/are launched. In some embodiments, converting the subset of data is performed by one or more data traversers. In some embodiments, the set of data is modified after the indication to convert the set of data. In some embodiments, the set of data is modified via a user insertion to the data set or a user modification of an object in the data set. In some embodiments, the set of data is live and continuously updated while the conversion occurs. In 406, data traverser(s) is/are managed. In some embodiments, the conversion manager waits for a first data traverser to reach a next subset in the data set to be converted before launching a second data traverser to process the subset that the first data traverser has finished processing. In some embodiments, the data traversers share a boundary definition and when a data traverser reaches a boundary it signifies that the data traverser has reached the next subset, causing the second data traverser to beginning processing the set of data. In some embodiments, the processes carried out by the data traversers take a different amount of time but the conversion manager delays traversers as necessary to regulate the desired subset delay between processes. In some embodiments, the conversion manager prevents multiple data traversers from simultaneously processing a specific data object of the set of data to be converted. In 408, an indication to end is received. In some embodiments, the indication to end is determined by an application server system. In some embodiments, the indication to end is determined by a client system In some embodiments, the indication to end is automated, for example, the indication to end is sent in the event that no new data objects have been added to the data set to be converted for a certain amount of time. In 410, the conversion is finalized. In some embodiments, finalizing the conversion entails triggering data traverser(s) to check for any newly added data objects to the data set to be converted or processed and setting the finalization toggle in the conversion definition. In some embodiments, finalizing the conversion entails switching over to the converted data set and deleting the original data set. In 412, it is determined whether all data conversion definitions have been process. For example, the data conversion managers checks for unprocessed data conversion definitions. In the event that not all data conversion definitions have been processed, control passes to 400.

Figure 5:
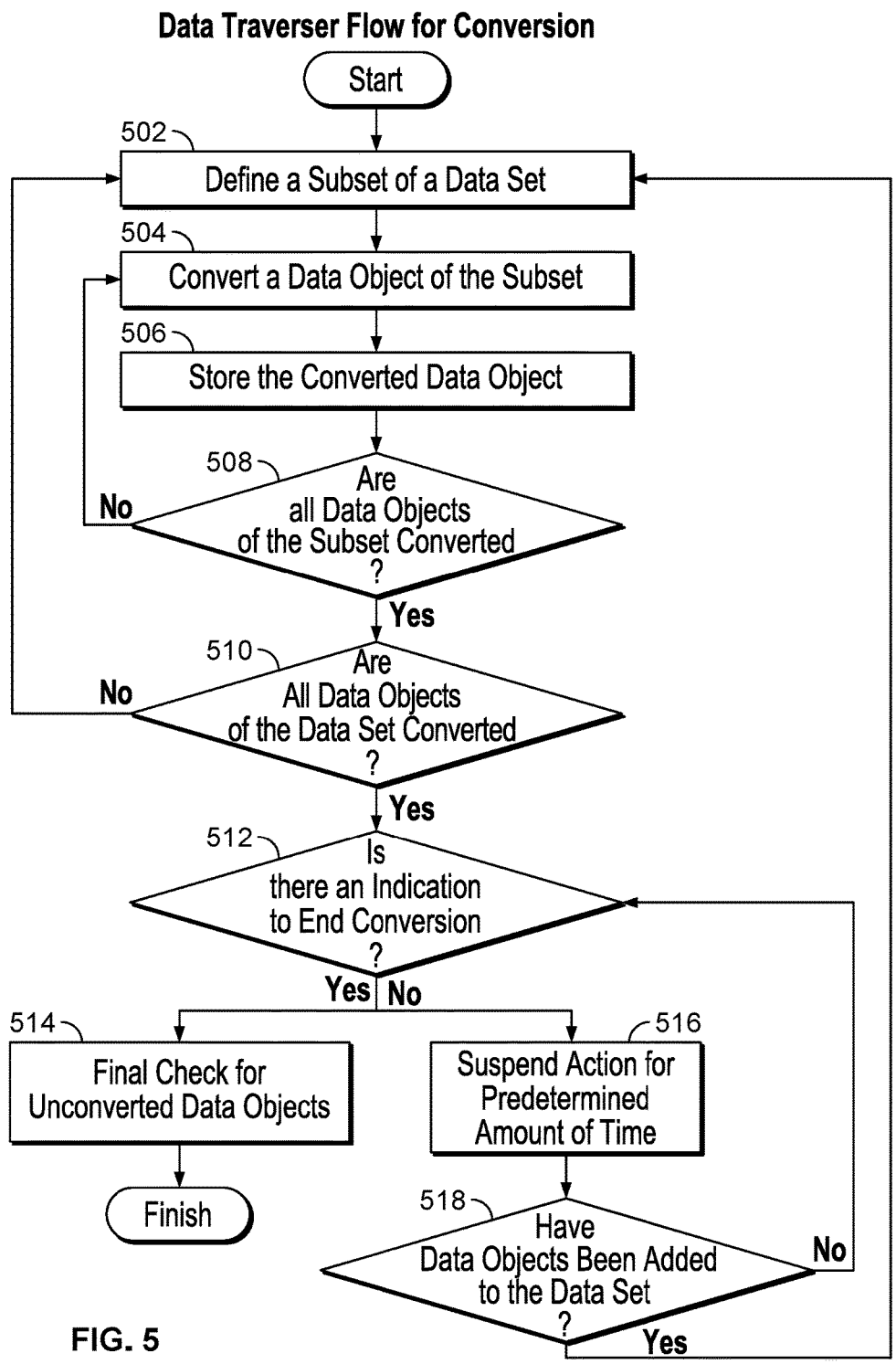
FIG. 5 is a flow diagram illustrating an embodiment of a data traverser process for conversion in a boundary-based data conversion.
Figure 6:
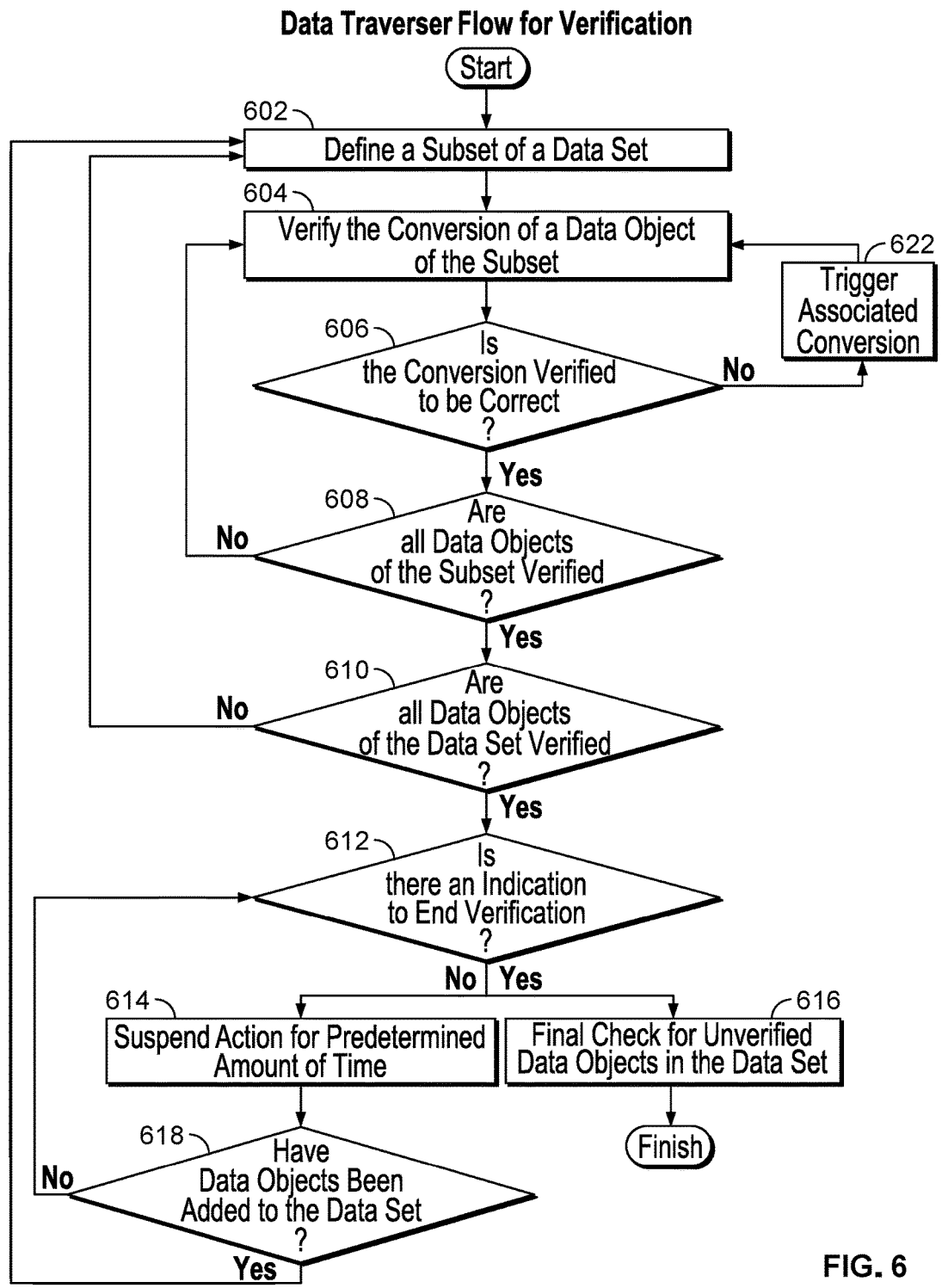
FIG. 6 is a flow diagram illustrating an embodiment of a data traverser process for verification in a boundary-based data conversion.

FIG. 5 is a flow diagram illustrating an embodiment of a data traverser process for conversion in a boundary-based data conversion. In some embodiments, the flow of FIG. 6 is implemented by conversion data traverser 352 of FIG. 3B. In some embodiments, the indication to start is provided by the data conversion manager. In 502, a subset of a data set is defined. For example, the data traverser defines a subset of a data set to be converted. The subset is based at least in part on the boundary condition. In 504, a data object of the subset is converted. In 506, the converted data object is stored. In some embodiments, it is stored in a memory location initiated by the conversion manager in a data storage system. In 508, it is determined whether all data objects of the subset are converted. In the event that not all data objects of the subset are converted, control transfers to 504. For example, a next data object is selected and converted a next data object of the subset. In the event that the entire subset is converted, it is determined whether all data objects in the data set are converted in 510. In the event that there are unconverted data objects in the data set, control transfers to 502 to define a next subset of the data set to begin conversion on. In the event that the entire data set is converted, it is determined whether there is an indication to end conversion in 512. In the event that there is not an indication to end conversion, action is suspended for a predetermined amount of time in 516. In various embodiments, the amount of time is determined by a developer or a client. In various embodiments, the indication to end conversion is sent by the client system, application system, or is predetermined, for example, set to a certain time when the data set is known to be not in use. After the predetermined amount of time has passed, in 518 it is determined whether data objects have been added to the data set. For example, the traverser checks for new unconverted data objects that have been added to the data set to be converted. In the event that objects have been added, control passes to 502 to define a next subset of the data set and convert the data objects. In the event that no objects have been added, control passes to 512 to check for an indication to end conversion. The boundary-based conversion system is able to sleep or be inactive using 516 and 518. In some embodiments, the data set to be converted is updated by a client while the conversion is taking place. The ability to turn inactive allows the conversion system to switch over to the converted data at a time that is convenient for the client, for example, a time when the client will not be accessing the data set. In the event that there is an indication to end conversion in 512, a final check for unconverted data objects is carried out in 514. For example, unconverted data objects are identified, listed for conversion, and converted. After any unconverted objects are converted, the process ends.

FIG. 6 is a flow diagram illustrating an embodiment of a data traverser process for verification in a boundary-based data conversion. In some embodiments, the flow of FIG. 6 is implemented by verification data traverser 354 of FIG. 3B. In some embodiments, the indication to start is provided by the data conversion manager. In 602, a subset of a data set is defined. For example, the data traverser defines a subset of a data set to be verified. The subset is based at least in part on the boundary condition. In 604, the conversion of a data object of the subset is verified. For example, the traverser verifies a first data object of the subset. In 606, it is determined whether the conversion is verified to be correct. For example, the verification is evaluated to see whether the conversion was done correctly or not. In the event that the conversion is not verified to be correct, in 622 the associated conversion is triggered and control passes to 604. In various embodiments, in the event that the conversion in not verified to correct, the associated conversion is not triggered and instead performs one or more of the following: halts all conversion, halts verification of the data set, reports the failure, or triggers another appropriate process based on a result of the verification process. In the event that the conversion is verified to be correct, in 608 it is determined whether all data objects of the subset are verified. In the event that all data objects of the subset are not verified, control passes to 604. In the event that all data objects of the subset are verified, in 610 it is determined whether all data objects of the data set are verified. In the event that all data objects of the data set are not verified, then control passes to 602. In some embodiments, the data conversion manager may pause the action of the data traverser in order to maintain delays between multiple data traversers. In the event that all data objects of the data set are verified, then in 612 it is determined whether there is an indication to end verification. In the event that there is not an indication to end verification, in 614 action is suspended for a predetermined amount of time. In various embodiments, the amount of time is determined by a developer or a client. After the predetermined amount of time has passed, in 618 it is determined whether data objects have been added to the data set. In the event that there have been data objects added to the data set, control passes to 602. In the event that data objects have not been added to the data set, control passes to 612 to check for an indication to end verification. In the event that there is an indication to end verification in 612, a final check for unverified data objects is carried out in 616. For example, unverified data objects are identified, listed for verification, and verified. After any unverified objects are verified, the process ends.

In some embodiments, the verification traverser is part of the triggered conversion. In various embodiments, verification occurs in any appropriate part of the process—for example, directly after a conversion, as a separate process behind the conversion, as a triggered process, or as any other appropriate process.

Figure 7:
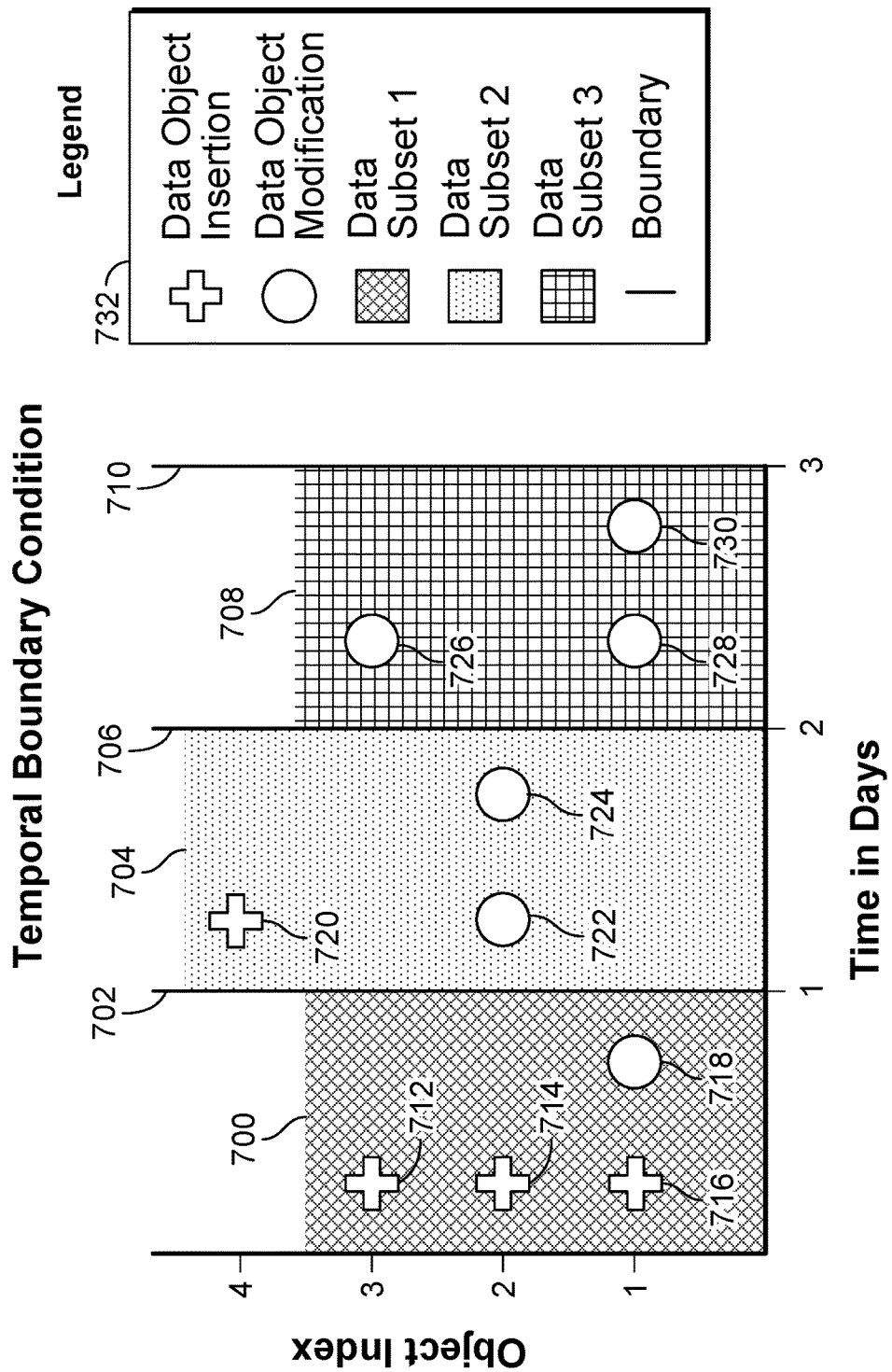
FIG. 7 is a graph illustrating an embodiment of a boundary-based conversion system with a temporal boundary.

FIG. 7 is a graph illustrating an embodiment of a boundary-based conversion system with a temporal boundary. In the example shown, legend 732 shows that crosses represent data object insertions to the data set and circles represent modifications of data objects of the data set. Insertions and modifications of data objects are marked on the graph based on the time the action was done and the index of the object. In some embodiments, the data object contains information on an employee address. In the employee address example, insertions 716, 714, 712, and 720 each represent an addition of a new employee to the data set. In the same example, modifications 718, 722, 724, 726, 728, and 730 each represent a modification of the employee's address. An employee address may experience multiple modifications over time. In the example shown, the boundary condition is defined as one day. First subset 700 is created by boundary 702 at day one. In some embodiments, conversion data traverser traverses data objects 712, 714, 716, and 718 of the first subset, converting each one. Data object 716 is an insertion and data object 718 is a modification of data object 716. In some embodiments, an employee data object retains a history of previous addresses. In some embodiments, data object 718 includes an updated address and a record of the original address disclosed in insertion 716. In some embodiments, converted data object 718 replaces converted data object 716 in the data set of converted data. Second subset 704 is created by boundary 706 at day two and encompasses modifications 722 and 724 of the second employee's address and insertion 720 of a fourth employee's address. Boundary 710 is set one day later, on day three, creating subset 708. Subset 708 comprises modification 728 and 730 to the first employee's address and modification 726 to the third employee's address. The temporal boundary allows the data conversion to respond robustly to modifications to the data set to be converted, whether they are insertions of new data objects to the data set or modifications of existing data objects.

Figure 8:
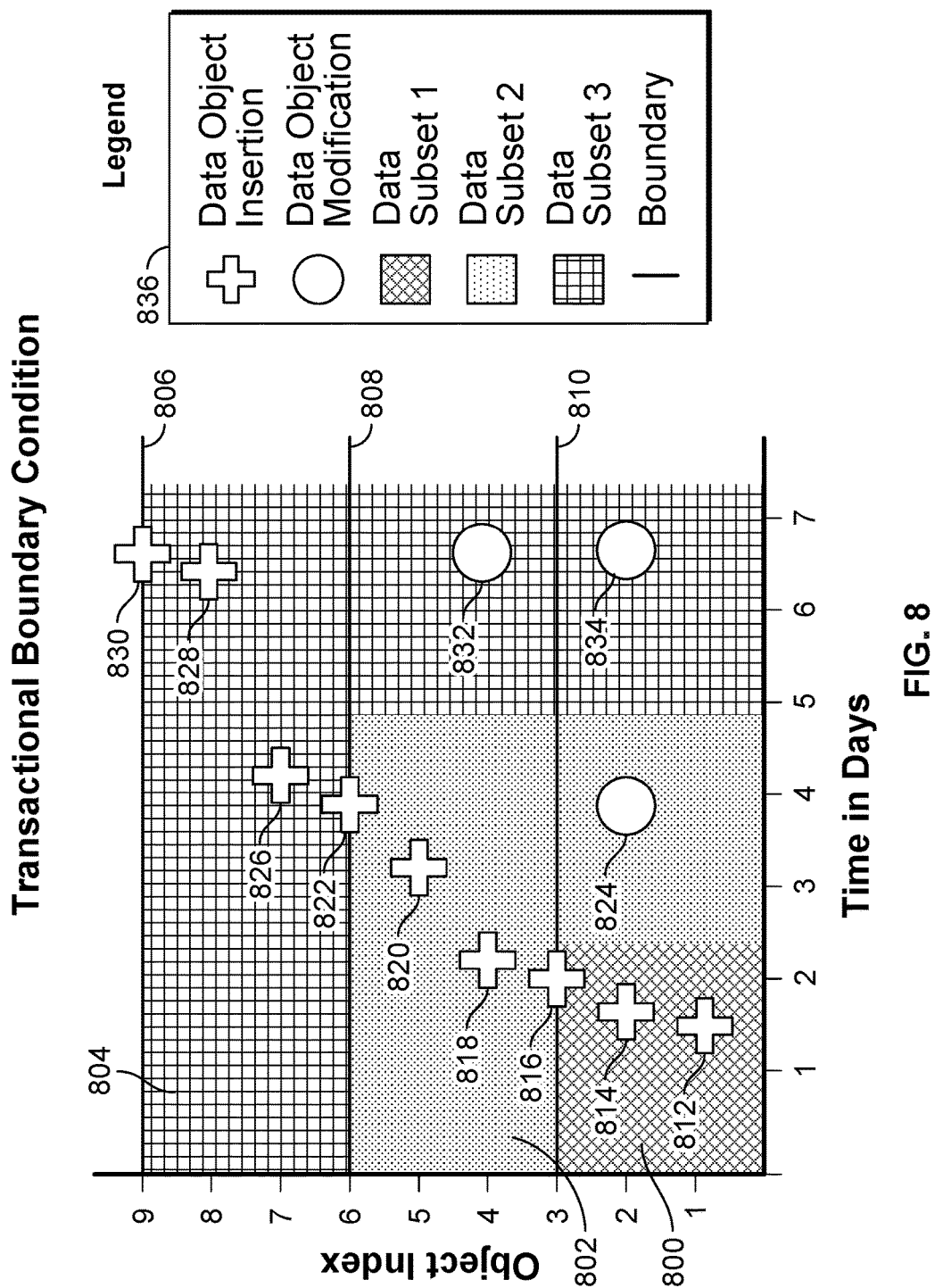
FIG. 8 is a graph illustrating an embodiment of a boundary-based conversion system with a transactional boundary.

FIG. 8 is a graph illustrating an embodiment of a boundary-based conversion system with a transactional boundary. In the example shown, legend 836 shows that crosses represent data object insertions to the data set and circles represent modifications of data objects of the data set. Insertions and modifications of data objects are marked on the graph based on the time the action was done and the index of the object. In some embodiments, the data object is a journal object and modifications to a journal object comprise insertions or deletions of content. In the example shown, the boundary condition is a transactional boundary defined as three data object insertions. The first subset begins at the first insertion and ends at the time of the third insertion. The three insertions and any data object modifications that happen between the time of the first and third data object insertions are included in the subset. Following subsets begin at the end of the former subset and proceed until the time that three more data objects are inserted. Data insertions 812, 814, and 816 comprise first subset 800 as defined by boundary 810. Data object insertions 818, 820, 822, and modification 824 to the second data object comprise second subset 802 as defined by boundary 808, which occurs at the sixth data object insertion. Data object insertions 826, 828, 830, and modifications 834 and 832 comprise the data objects of the third subset as defined by boundary 806, which occurs at the ninth data object insertion. In some embodiments, a transactional boundary is based on the number of data object insertions, data object modifications, both, or another appropriate transaction metric. In some embodiments, when a change to the data set occurs at the same time as the change used as a transactional boundary, the second transaction is determined to be part of the following subset. For example, modification 824 occurs at the same exact time as insertion 826, modification 824 is determined to be part of the second subset. In some embodiments, in the event that a change to the data set occurs at the same time as the change used as a transactional boundary, the modification is determined to be part of the same subset as the change used as a transactional boundary.

In various embodiments, a boundary comprises a time boundary, an object ID number boundary, a combination of time and object number boundary, or any other appropriate boundary.

Figure 9A:
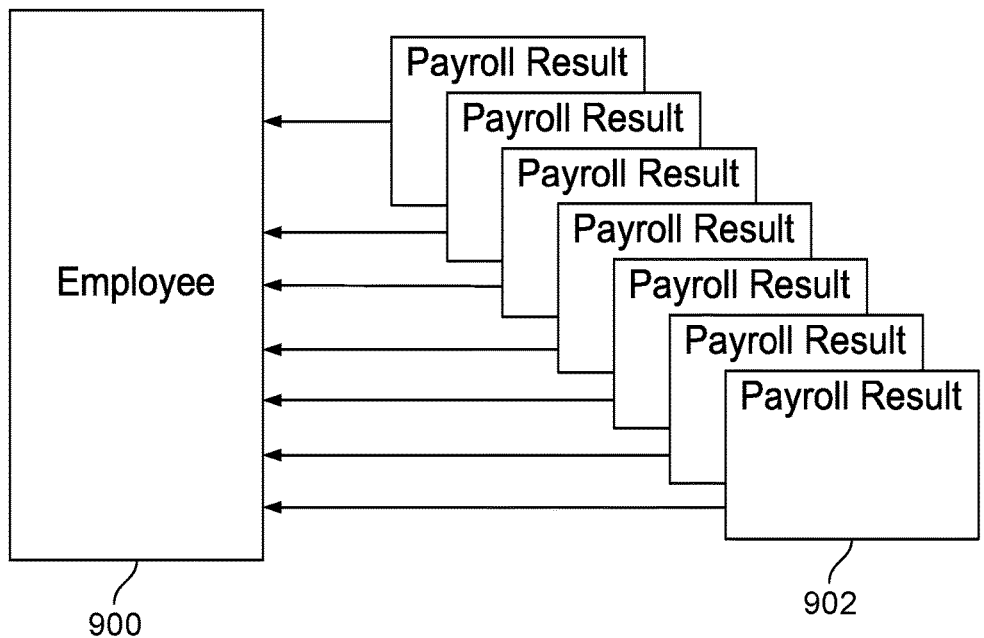
FIG. 9A is a diagram illustrating an embodiment of a data object before a boundary-based conversion comprising a relationship.

FIG. 9A is a diagram illustrating an embodiment of a data object before a boundary-based conversion comprising a relationship. In some embodiments, the data conversion definition comprises a relationship. In some embodiments, FIG. 9A is a diagram illustrating an employee object before conversion. In some embodiments, employee object 900 comprises unconverted parts of a data set. In the example shown, employee object 900 comprises a set of unidirectional links from a set of payroll result objects (e.g., payroll result object 902). The connections between employee object 900 and the payroll result objects are only from the payroll result objects to employee object 900 and not in the opposite direction. In the event it is necessary to access employee information associated with a payroll result, the set of all payroll result objects can be searched, and all payroll result objects pointing to the employee identified. This process is more time consuming than it would be in the event that employee object 900 pointed to the payroll result objects.

Figure 9B:
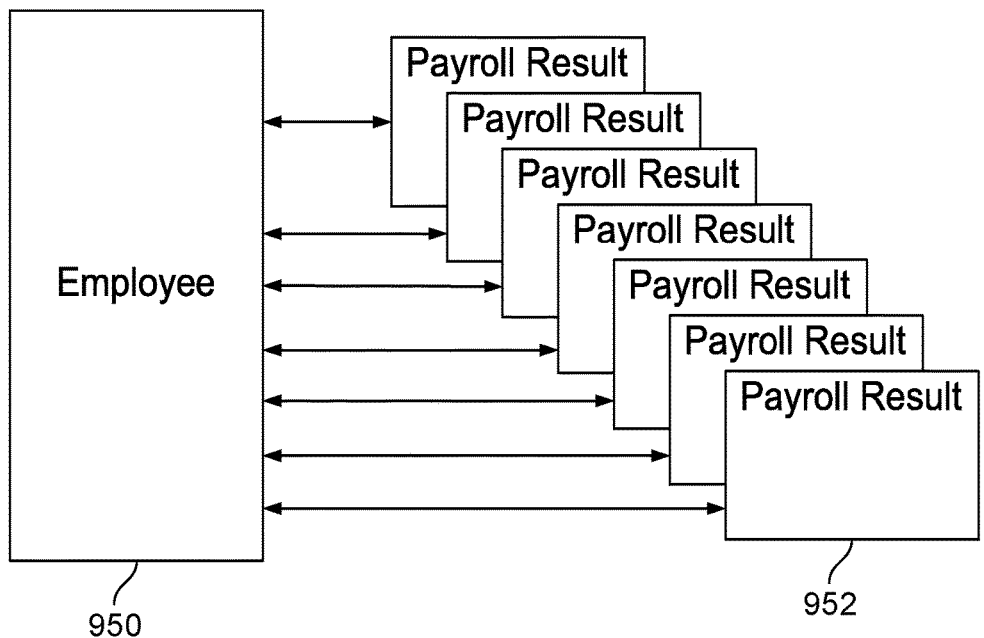
FIG. 9B is a diagram illustrating an embodiment of a data object after a boundary-based conversion comprising a relationship.

FIG. 9B is a diagram illustrating an embodiment of a data object after a boundary-based conversion comprising a relationship. In some embodiments, FIG. 9B is a diagram illustrating an employee object after conversion. In some embodiments, employee object 950 comprises converted parts of a data set. In the example shown, employee object 950 comprises a set of bidirectional links to a set of payroll result objects (e.g., payroll result object 902). From employee object 950 each payroll result associated with it can be accessed. Each payroll result additionally links back to employee object 950, identifying the employee it is associated with. In some embodiments, in the event it is necessary to access all payroll result objects associated with an employee, the payroll result objects are able to be accessed directly by looking up the employee. In some embodiments, employee object 950 comprises a single payroll result link (e.g., to the most recent payroll result). In some embodiments, conversion of an object definition (e.g., from employee object 900 of FIG. 9A to employee object 950 of FIG. 9B) is performed using a boundary-based conversion process.

Figure 10:
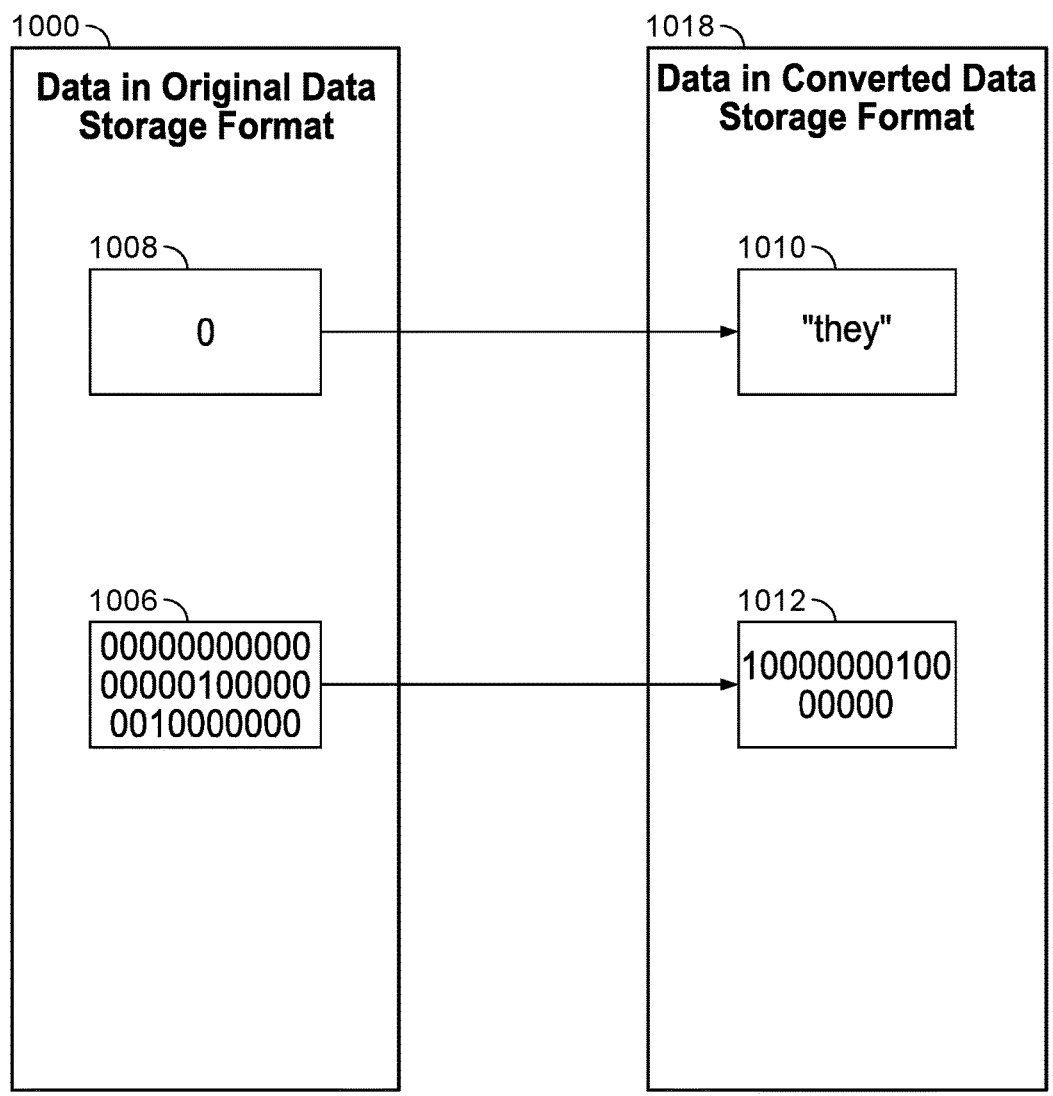
FIG. 10 is a diagram illustrating an embodiment of a boundary-based data conversion comprising a data storage format change.

FIG. 10 is a diagram illustrating an embodiment of a boundary-based data conversion comprising a data storage format change. In some embodiments, the data conversion definition comprises a data storage format change. Data in an original data storage format 1000 comprises data object 1008 and data object 1006. Data in a converted data storage format 1018 comprises data object 1010 and data object 1012. In some embodiments, data 1000 is converted to data 1018 using a boundary-based system for data conversion. In some embodiments, data object 1008 is int type and comprises the integer "0." In some embodiments, "0" represents females and "1" represents males in a human resources system. In some embodiments, the system is changed to allow users to enter a desired pronoun in lieu of assigning "he" or "she" based on gender. In some embodiments, converted data object 1010 is of type string and comprises the string "they" in the event that a user's desired pronoun is "they." In some embodiments, data object 1006 comprises "00000000000000001000000010000000" and is type "long," which comprises four bytes. In some embodiments, a data storage format conversion is performed to convert data object 1006 to data object 1012 "1000000010000000" which is type "short," comprising two bytes. In some embodiments, a data storage format change comprises a conversion of a data object where data values are stored in a history stack (e.g., all data values for the history of the variable) to a data object that stores the header (e.g., a current value) and a history stack (e.g., all prior values).

In some embodiments, a schema change in a relational database requires an alternate table that incurs hours of downtime in the case that the tables are large. In some embodiments, as long as there are semantics in the tables, such as identifiers for new rows and last updated rows, a boundary-based data conversion system can be used to convert the database. Database tables typically define an ID field as AUTO_INCREMENT PRIMARY_KEY to define newly added rows and also define created_at and updated_at TIMESTAMP fields to define when the rows are created or last updated. In some embodiments, a boundary-based conversion system applies a boundary condition based on the ID or updated_at information to implement the schema change.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for data conversion, comprising:
an interface to receive an indication to convert a set of data; and
a processor to:
determine a plurality of subsets of the set of data based at least in part on a boundary condition, wherein the boundary condition comprises one of a temporal boundary or a transactional boundary, wherein the determining of the plurality of subsets of the set of data comprises to:
determine whether a piece of data of the set of data satisfies the boundary condition; and
assign the piece of data to a first subset of data or a second subset of data based on whether the piece of data satisfies or does not satisfy the boundary condition, respectively, the plurality of subsets including the first subset of data and the second subset of data;
convert one of the plurality of subsets of data to a converted subset of data, wherein converting the one of the plurality of subsets of data comprises traversing unconverted data objects of the one of the plurality of subsets of data by one or more data traversers, wherein the one subset of data is converted before another subset of data; and
provide the converted subset of data.

2. The system of claim 1, wherein the indication to convert a set of data comprises a data conversion definition.

3. The system of claim 2, wherein the data conversion definition comprises a relationship between an input data structure and an output data structure.

4. The system of claim 2, wherein the data conversion definition comprises a conversion of a data object of the set of data from an input data structure to an output data structure.

5. The system of claim 2, wherein the data conversion definition comprises a process that triggers another process based on a result of the process.

6. The system of claim 2, wherein the data conversion definition comprises multiple processes performed sequentially on the set of data.

7. The system of claim 6, wherein converting the one subset of data comprises verifying the one subset of data has been converted.

8. The system of claim 1, wherein the set of data is modified after the indication to convert the set of data.

9. The system of claim 1, wherein the processor is further to convert the other data subset of the set of data.

10. The system of claim 1, wherein the processor is further to store the converted subset of data in a memory location different than the one subset of data.

11. The system of claim 1, wherein a first data traverser of the one or more data traversers and a second data traverser of the one or more data traversers simultaneously process the set of data.

12. The system of claim 1, wherein a first data traverser of the one or more data traversers and a second data traverser of the one or more data traversers do not simultaneously process a specific data object of the one subset of data.

13. The system of claim 1, wherein a first data traverser of the one or more data traversers reaching a boundary causes a second data traverser of the one or more data traversers to begin processing the other subset of data.

14. The system of claim 1, wherein the one or more data traversers share the boundary condition.

15. The system of claim 1, wherein the indication to convert the set of data comprises an activation toggle.

16. The system of claim 1, wherein the indication to convert the set of data comprises a finalization toggle.

17. A method for data conversion, comprising:
receiving an indication to convert a set of data;
determining, using a processor, a plurality of subsets of the set of data based at least in part on a boundary condition, wherein the boundary condition comprises one of a temporal boundary or a transactional boundary, wherein the determining of the plurality of subsets of the set of data comprises:
determining whether a piece of data of the set of data satisfies the boundary condition; and
assigning the piece of data to a first subset of data or a second subset of data based on whether the piece of data satisfies or does not satisfy the boundary condition, respectively, the plurality of subsets including the first subset of data and the second subset of data;
converting one of the plurality of subsets of data to a converted subset of data, wherein converting the one of the plurality of subsets of data comprises traversing unconverted data objects of the one of the plurality of subsets of data by one or more data traversers, wherein the one subset of data is converted before another subset of data; and
providing the converted subset of data.

18. A computer program product for data conversion, the computer program product being embodied in a non-transitory computer readable storage medium and comprising computer instructions for:
receiving an indication to convert a set of data;
determining a plurality of subsets of the set of data based at least in part on a boundary condition, wherein the boundary condition comprises one of a temporal boundary or a transactional boundary, wherein the determining of the plurality of subsets of the set of data comprises:
determining whether a piece of data of the set of data satisfies the boundary condition; and
assigning the piece of data to a first subset of data or a second subset of data based on whether the piece of data satisfies or does not satisfy the boundary condition, respectively, the plurality of subsets including the first subset of data and the second subset of data;
converting one of the plurality of subsets of data to a converted subset of data, wherein converting the one of the plurality of subsets of data comprises traversing unconverted data objects of the one of the plurality of subsets of data by one or more data traversers, wherein the one subset of data is converted before another subset of data; and
providing the converted subset of data.

* * * * *